(12) United States Patent
Wilde

(10) Patent No.: US 6,389,750 B1
(45) Date of Patent: May 21, 2002

(54) APPARATUS FOR WATERING PLANTS

(76) Inventor: Charles David Wilde, 15 Pinewood Way, St. Leonards on Sea, East Sussex TN38 9RR (GB)

( * ) Notice: Subject to any disclaimer, the term of this patent is extended or adjusted under 35 U.S.C. 154(b) by 0 days.

(21) Appl. No.: 09/463,401
(22) PCT Filed: Aug. 3, 1998
(86) PCT No.: PCT/GB98/02178
 § 371 Date: May 17, 2000
 § 102(e) Date: May 17, 2000
(87) PCT Pub. No.: WO99/05901
 PCT Pub. Date: Feb. 11, 1999

(30) Foreign Application Priority Data

Aug. 1, 1997 (GB) ............................................. 9716256

(51) Int. Cl.⁷ ......................... A01G 27/00; A01G 27/02
(52) U.S. Cl. ........................................... 47/79; 47/65.8
(58) Field of Search .............................. 47/59, 63, 64, 47/48.5, 79, 80, 65.8

(56) References Cited

U.S. PATENT DOCUMENTS

| | | | | |
|---|---|---|---|---|
| 3,613,309 A | * | 10/1971 | Coburn | |
| 4,087,938 A | * | 5/1978 | Koch | |
| 4,829,707 A | * | 5/1989 | Koffler et al. | |
| 4,918,861 A | * | 4/1990 | Carpenter et al. | .......... 47/59 X |
| 5,009,031 A | * | 4/1991 | Knop et al. | |
| 5,193,306 A | * | 3/1993 | Whisenant | .................. 47/59 X |
| 5,309,673 A | * | 5/1994 | Stover | ............................ 47/59 |

FOREIGN PATENT DOCUMENTS

| | | | |
|---|---|---|---|
| DE | 004309601 A1 | * | 10/1993 |
| GB | 2250171 A | * | 6/1992 |
| GB | 2301014 A | * | 11/1996 |
| JP | 410023834 A | * | 1/1998 |
| WO | WO 91/07870 | * | 6/1991 |

* cited by examiner

Primary Examiner—Peter M. Poon
Assistant Examiner—Jeffrey L. Gellner
(74) Attorney, Agent, or Firm—Bacon & Thomas, PLLC

(57) ABSTRACT

The combination of watering apparatus and a plastics bag containing a growing medium (hereinafter referred to as "grow bag"). The watering apparatus comprises an open topped vessel (1) formed with an opening (2) positioned towards its base through which water present in the vessel (1) can leave. The grow bag (4) is formed with a lengthwise extending sleeve (6) of generally inverted channel shape and is closed at each end. The sleeve (6) overlies a substantially linear array of holes (5) formed in the upper surface of the grow bag (4). In use, the opening (2) of the vessel (1) is positioned adjacent to a pierced end of the sleeve (6) so that water leaving the vessel opening (2) enters the sleeve (6) and passes through the holes (5) formed in the bag surface to water the growing medium of the grow bag (4).

7 Claims, 2 Drawing Sheets

APPARATUS FOR WATERING PLANTS

BACKGROUND OF THE INVENTION

This invention relates to apparatus for watering plants and more especially to apparatus for watering plants, seedlings and seeds (all referred to hereinafter simply as "plants") bedded into a growing medium contained within a plastics enclosure such as a grow bag.

Grow bags in themselves are well known and generally are accepted as a useful way of growing flowers and produce such as tomatoes in a variety of locations including greenhouses, patios, sun rooms and balconies. Grow bags essentially comprise a formulated growing medium sealed within a plastics bag and provide a complete environment in which flowers and crops can be grown. Conveniently, grow bags are marked with lines to indicate to the user where incisions should be made in the plastics covering for the planting of individual seeds or seedlings. Such incisions are normally small in comparison with the overall size of the grow bag to minimise inter alia the effect of evaporation. Relatively small incisions means that only a small amount of the growing medium is subjected to the effects of sun and wind. This need to minimise the amount of growing medium exposed to the elements has hitherto required that watering of the grow bag contents is effected through the incisions made to receive plants. Watering through these relatively small incisions to an adequate extent to feed all plants bedded in the growing medium is difficult to achieve and almost impossible to check. The alternative is to remove the uppermost side of the plastics covering. Whilst this assists the watering process, it also maximises the effects of evaporation and loss of growing medium. In both cases, the gardener runs the risk of wetting a plant's leaves thereby causing plant burn. A further problem associated with grow bags is caused by the fact that they generally have high contents of peat and fibrous material which are both light and easily disturbed by water. If placed in direct sunlight any water added to the growing medium will rapidly evaporate. Once dried, the peat and fibrous material will not accept fresh water readily, choosing instead to float on water added to the bag contents and, in time, to flow over the edges of the plant receiving holes of the bag. Repeated watering tends to erode growing medium from plant-receiving holes of the bag which, in time, can lead to damage to the root systems of the plants, leaving the plants open to possible attack from insect or fungal organisms.

Erosion of discharged peat and water from the bag can also be unsightly, particularly when the bag is positioned on a balcony, patio or the like.

If a grow bag is to be used for produce such as lettuces, a higher density of plants is normally required. This, in itself, can create problems in that it is unlikely that water fed to the bag contents will be distributed satisfactorily to all plants present in a bag. Also, the problems referred to above concerning evaporation and erosion are worsened with each hole cut into a grow bag.

Co-pending International Application WO 93/23989 discloses apparatus which comprises a water-receiving reservoir which communicates with one end of a pipe formed along its length with a series of spaced holes through which water introduced into the reservoir can flow. In use, the pipe is pushed into one side of a grow bag and lies on top of the growing medium present in the bag, the plastics surface of the bag lying on top of the pipe. One problem which can arise with this apparatus is that the presence of the pipe within the plastics bag reduces the surface area of the growing medium of the bag; furthermore water admitted to the bag interior through the pipe does not always flow evenly to th e entire bag contents.

SUMMARY OF THE INVENTION

The present invention sets out to provide watering apparatus which overcomes, or at least alleviates, the problems referred to above.

According to the present invention there is provided watering apparatus for use in combination with a plastics bag containing a growing medium (hereinafter referred to as "grow bag"), the apparatus comprising an open topped vessel formed with an opening positioned towards its base through which water present in the vessel can leave, and a grow bag formed with a lengthwise extending sleeve of generally inverted channel shape and closed at each end which overlies a substantially linear array of holes formed in the upper surface of the grow bag, the arrangement being such that in use the opening of the vessel is positioned adjacent to a pierced end of the sleeve whereby water leaving the vessel opening enters the sleeve and passes through the holes formed in the bag surface to water the growing medium of the grow bag.

The border of the vessel opening may be circumvented by an outwardly protruding tube which acts to support or co-operate with the adjoining end of the sleeve.

The open top of the vessel may support a cap including a multiplicity of holes through which water can enter the vessel. The cap may be secured to the uppermost rim of the vessel or may be detachable therefrom.

The holes formed in the surface of the grow bag may be evenly spaced or the spacing between neighbouring pairs of holes may increase from one end of the bag to the other.

BRIEF DESCRIPTION OF THE DRAWINGS

The invention will now be described by way of example only with reference to the accompanying diagrammatic drawings in which.

DETAILED DESCRIPTION OF THE INVENTION

Figure 1:
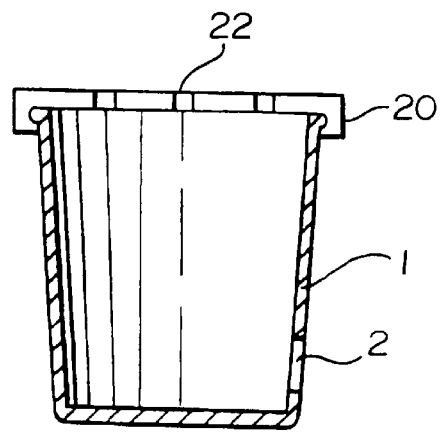
FIG. 1 is a side view in section of an open topped vessel forming one part of watering apparatus in accordance with the invention.

The vessel 1 illustrated in FIG. 1 is open topped and includes in the lower part of one wall an opening 2. The vessel 1 may include a cap 20 formed with a multiplicity of holes 22 through which water can enter the vessel. The cap 20 surface may take the form of an open grid or may include a plurality of round or other shaped openings 22. The cap 20 may be permanently secured to the upper rim of the vessel or may be separable therefrom. The vessel may be produced from a plastics material.

Figure 2:
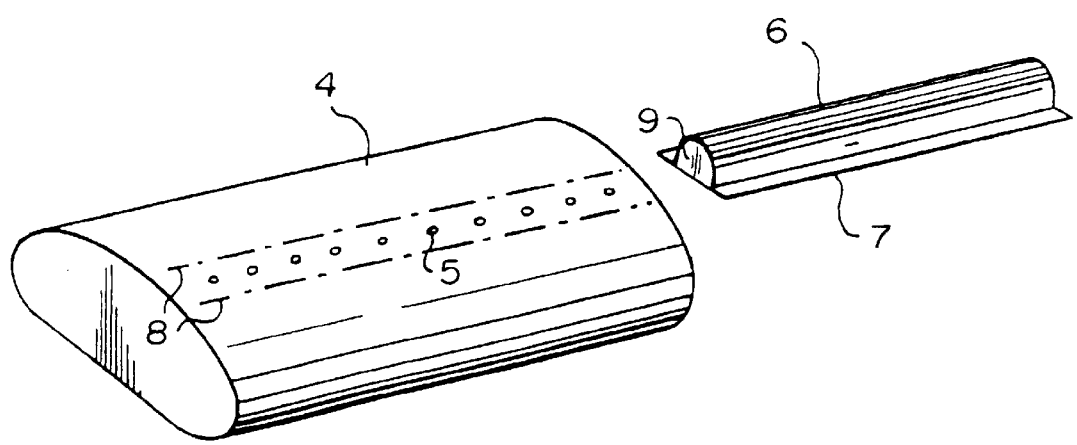
FIG. 2 is a perspective exploded view of a grow bag and sleeve forming additional parts of apparatus in accordance with the invention.

The grow bag 4 illustrated in FIG. 2 comprises a sealed plastics bag containing a quantity of growing medium. The upper surface of the grow bag is formed with a linear array of spaced holes 5. The spacing between each pair of neighbouring holes 5 may be the same or may be increased from one end of the bag 4 to the other.

The line of holes 5 is covered by a sleeve 6 of inverted-channel shape having outwardly extending sides 7 which are heat sealed or otherwise secured to the bag surface along chain dotted lines 8. The plastics ends 9 of the sleeve 6 are closed. The sleeve 6 may be produced from a semi rigid plastics material.

Figure 3:
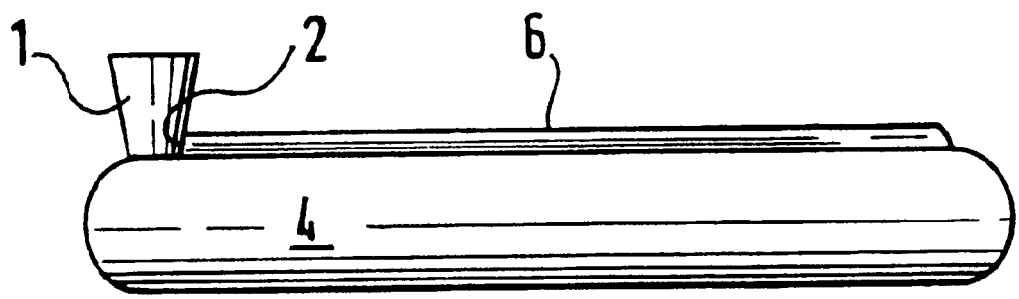
FIG. 3 is a perspective view of the vessel of FIG. 1 and the grow bag and sleeve of FIG. 2 when assembled.

As will be seen from FIG. 3, the vessel 1 is positioned on the bag 4 with its opening 2 adjacent one end of the sleeve 6, this sleeve end having been opened by a suitable incision.

Figure 4:
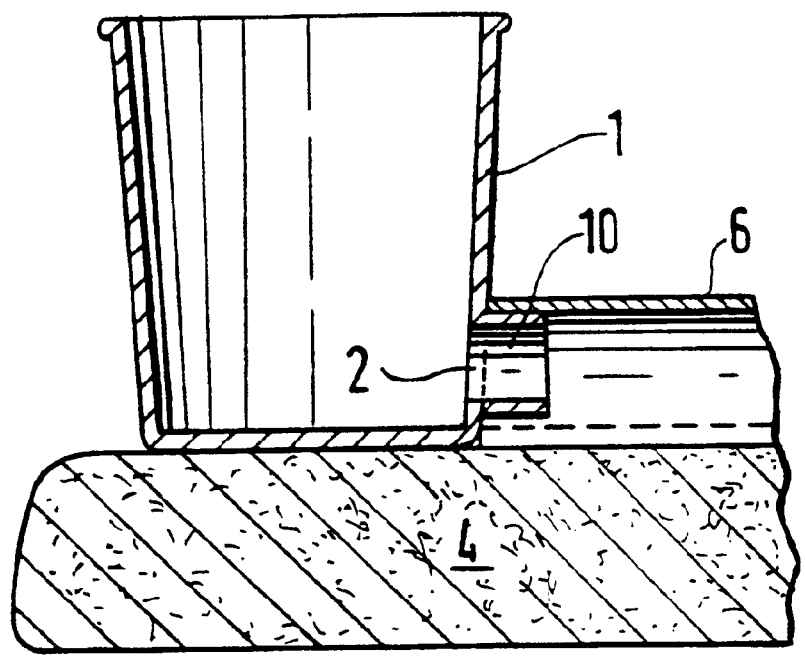
FIG. 4 is a section taken through the vessel, sleeve and grow bag when assembled.

As will be seen from FIG. 4, when assembled the opening 2 of the vessel communicates directly with the opened end of the sleeve 6. Water entering the sleeve from the vessel then passes through the sleeve entering the bag via the holes 5. In this arrangement a short tube 10 protrudes outwardly from the wall of the vessel 1 and about the circumference of the opening 2 to provide a locating surface for the adjoining end of the tube.

It will be appreciated that the foregoing is merely exemplary of watering apparatus in accordance with the invention and that modifications can readily be made thereto without departing from the true scope of the invention as set out in the appended claims.

What is claimed is:

1. A watering apparatus comprising:
   an open topped vessel formed with an opening positioned near a base thereof permitting water present in the vessel to pass therethrough;
   a grow bag formed of a plastic material and containing a growing medium, said grow bag having a substantially linear array of holes formed along the upper surface thereof; and
   a lengthwise extending sleeve defining a generally inverted channel shape, said sleeve being closed at each end and positioned on said grow bag along and covering the linear array of holes;
   wherein the opening of the vessel is positioned adjacent to a pierced, adjoining end of the sleeve such that water passing through the vessel opening enters the sleeve and passes through the holes formed in the bag surface to water the growing medium.

2. The apparatus as claimed in claim 1 wherein a tube is positioned about the circumference of the vessel opening and protrudes outwardly therefrom to cooperate with the adjoining end of said sleeve.

3. The apparatus as claimed in claim 1 wherein the open top of said vessel supports a cap defining a plurality of holes configured and dimensioned to permit water to enter the vessel.

4. The apparatus as claimed in claim 3 wherein the cap is secured to an uppermost rim of the vessel.

5. The apparatus as claimed in claim 3 wherein the cap is detachable.

6. The apparatus as claimed in claim 1 wherein the holes formed along the surface of the grow bag are evenly spaced.

7. The apparatus as claimed in claim 1 wherein the spacing between adjacent holes formed along the surface of the grow bag progressively increases along the length of the grow bag.

* * * * *